US012435268B2

(12) United States Patent
Yu et al.

(10) Patent No.: US 12,435,268 B2
(45) Date of Patent: Oct. 7, 2025

(54) RNA FLUORESCENT PROBE FOR RAPIDLY DISTINGUISHING CANCER TISSUE FROM NORMAL TISSUE BASED ON NUCLEOLAR MORPHOLOGICAL CHANGES

(71) Applicant: SHANDONG UNIVERSITY, Shandong (CN)

(72) Inventors: Xiaoqiang Yu, Jinan (CN); Peng Gao, Jinan (CN); Xiuquan He, Jinan (CN); Fangfang Meng, Jinan (CN); Junyi He, Jinan (CN); Zhiqiang Liu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 1018 days.

(21) Appl. No.: 17/606,271

(22) PCT Filed: Dec. 3, 2020

(86) PCT No.: PCT/CN2020/133634
§ 371 (c)(1),
(2) Date: Oct. 25, 2021

(87) PCT Pub. No.: WO2022/016770
PCT Pub. Date: Jan. 27, 2022

(65) Prior Publication Data
US 2022/0325173 A1    Oct. 13, 2022

(30) Foreign Application Priority Data

Jul. 22, 2020   (CN) .......................... 202010711275.1

(51) Int. Cl.
*C09K 11/06*    (2006.01)
*C07D 401/06*    (2006.01)
(Continued)

(52) U.S. Cl.
CPC ............ *C09K 11/06* (2013.01); *C07D 401/06* (2013.01); *G01N 1/30* (2013.01); *G01N 21/6428* (2013.01);
(Continued)

(58) Field of Classification Search
CPC ........ C09K 11/06; C07D 401/06; G01N 1/30; G01N 21/6428; G01N 33/582
See application file for complete search history.

(56) References Cited

U.S. PATENT DOCUMENTS

2016/0243264 A1    8/2016   Li et al.

FOREIGN PATENT DOCUMENTS

| CN | 101100465 A | 1/2008 |
|---|---|---|
| CN | 103265947 A | 8/2013 |

(Continued)

OTHER PUBLICATIONS

Hao et al.; "Studies on interactions of carbazole derivatives with DNA, cell image, and cytotoxicity," Bioorganic & Medicinal Chemistry; 2017; pp. 1-21.

(Continued)

*Primary Examiner* — Jezia Riley
(74) *Attorney, Agent, or Firm* — Oliff PLC

(57) ABSTRACT

An RNA fluorescent probe for rapidly distinguishing cancer tissue from normal tissue based on nucleolar morphological changes, the probe being (E)-1-(3-aminopropyl)-4-(2-(9-ethyl-9H-carbazol-3-yl)vinyl)pyridine-1-ium dibromide, abbreviated as CAPY-AP. The probe can target RNA in culture cells and normal tissue as well as cancer tissue and then display nucleolar morphology. The judging criteria of distinguishing the cancer tissue from the normal tissue based on the nucleolar morphological changes is only single and unconspicuous nucleolus in most cells of normal tissue, while the enlarged nucleoli and/or multiple nucleoli exist in (Continued)

many cells of cancer tissue. Compared with other existing RNA probes, the probe has super-high RNA affinity and super-high permeability, and can rapidly image the RNA and nucleoli in tissue sections. Additionally, the probe has characteristics of good membrane permeability, strong fluorescence and good photostability, and is expected to be applied in preparation of intraoperative pathological diagnostic reagents for tumors.

10 Claims, 2 Drawing Sheets

(51) Int. Cl.
  *G01N 1/30* (2006.01)
  *G01N 21/64* (2006.01)
  *G01N 33/58* (2006.01)
(52) U.S. Cl.
  CPC .... *G01N 33/582* (2013.01); *C09K 2211/1018* (2013.01); *G01N 2001/302* (2013.01); *G01N 2021/6439* (2013.01)

(56) References Cited

FOREIGN PATENT DOCUMENTS

| CN | 103275699 A | 9/2013 |
| CN | 112239455 A | 1/2021 |
| WO | 2011/025329 A2 | 3/2011 |

OTHER PUBLICATIONS

Krieg et al.; "N, N-Dialkylaminostyryl dyes: specific and highly fluorescent substrates of peroxidase and their application in histochemistry;" J Mol Hist; 2008; pp. 169-191; vol. 39, No. 1.

Apr. 6, 2021 Search Report issued in International Patent Application No. PCT/CN2020/133634.

Apr. 6, 2021 Written Opinion of the International Searching Authority issued in International Patent Application No. PCT/CN2020/133634.

May 8, 2021 Office Action issued in Chinese Patent Application No. 202010711275.1.

RNA FLUORESCENT PROBE FOR RAPIDLY DISTINGUISHING CANCER TISSUE FROM NORMAL TISSUE BASED ON NUCLEOLAR MORPHOLOGICAL CHANGES

BACKGROUND

Technical Field

The present invention relates to a fluorescent probe which can target RNA in culture cells and normal tissue as well as cancer tissue and then display nucleolar morphology, in particular to an RNA fluorescent probe for rapidly distinguishing cancer tissue from normal tissue based on nucleolar morphological changes and its application in preparation of intraoperative pathological diagnostic reagents for tumors.

Background

Diagnostic reagents, methods and technologies of serious diseases have always been the focus of international high-tech development. And, cancer ranks as a leading cause of death and also is an important barrier to increasing life expectancy in every country of the world.

Surgical excision of tumor tissue is an effective treatment method widely used at present. However, surgical plans of benign tumors and cancers are completely different, and must be strictly differentiated. Local excision is performed for benign tumors, and large-scale radical excision and lymph node dissection are performed for malignant tumors. If a cancer is misdiagnosed as benign, a second operation may be required. Conversely, it is a major medical malpractice. Therefore, intraoperative pathological diagnosis, which helps pathologists to determine the nature of a tumor and then assists surgeons to decide a surgical plan, is indispensable. Intraoperative diagnosis refers to real-time and on-site sampling of a patient after general anesthesia for operation on an operating table. It has the following advantages: pathologists can acquire big pathological samples from accurate locations, and some medical risks can be avoided, such as internal bleeding occurring in the sampling process of preoperative puncture biopsy. However, due to the fact that the surgeon is waiting for pathological diagnosis results in the operating room, the report to determine the benign or malignant tumors must be given within 30 minutes, and thus the intraoperative pathological diagnosis is also called rapid diagnosis. Due to the strict time requirement, in addition to hematoxylin-eosin staining (i.e. H&E staining), no other method can provide valuable diagnostic information within such a short time for over one hundred years. As a result, pathologists have to make intraoperative pathological diagnosis only based on the results of H&E staining.

As is known to all, disease diagnosis is very important but extremely difficult, and thus it is a medical taboo to make a diagnosis by means of sole evidence. However, due to the lack of effective methods rapidly distinguishing cancer tissue from normal tissue, H&E staining is the only technology for intraoperative pathological diagnosis of tumors so far. This will not only increase the risk of misdiagnosis but also bring great pressure to the pathologists. Therefore, it is urgent to establish a novel method rapidly distinguishing cancer tissue from normal tissue, so as to resolve the general technical problem that intraoperative pathological diagnosis only rely on the H&E staining method, and break the current dilemma of diagnosis with sole evidence. However, for over one hundred years, no other technology can overcome the bottleneck of making a pathologic diagnosis in 30 minutes.

The principle of H&E staining method is the acid-base reactions between acidic/basic dyes and acidophilic/basophilic substances in pathological tissue. Concretely, to use basic hematoxylin stains basophilic nuclei and to use acidic eosin stains acidophilic cytoplasm and extracellular matrix. Thus nuclei present blue, while cytoplasm and extracellular matrix present pink. But, due to the limitation of the H&E staining principle, it cannot show change of molecule level which occurs in tumor cells.

Ribonucleic acid (RNA) plays an important role in biological evolution, and particularly a decisive role in the translation of genetic information. In cells, according to different structures and functions, RNAs are mainly divided into the following three categories: messenger RNA (mRNA), transfer RNA (tRNA), and ribosomal RNA (rRNA). Recent studies have shown that RNAs are closely related to the biological behavior of tumors.

Nucleoli, the synthetic sites of rRNA, although have been known for more than 100 years, their biological functions have not been fully understood. It is generally believed that the nucleoli are only the sites for transcription, processing, and assembly of the rRNA in nuclei. With the development of science, the changes of the nucleoli in cancerous cells have attracted increasing attention in the medical field. Recent studies have shown that not only the sizes, shapes and location of the nuclei in cancer cells differ from those of normal cells, but also the sizes, shapes, location and numbers of the nucleoli in cancerous cells show prominent changes. Moreover, studies have found that nucleolar abnormalities are general features of the cancer cells. For example, giant nucleolus has become an important diagnostic basis for large cell lung cancer and Hodgkin's disease. And there are also enlarged nucleoli in prostate intraepithelial tumor cells. On the contrary, ultra-small nucleoli are a diagnostic basis for cervical intraepithelial neoplasm lesion and small cell anaplasia lung cancer. The following table summarizes the characteristics of nucleoli associated with cancers.

TABLE 1

Cellular Nucleolar Changes Associated with Cancers

| Nucleolar Changes | Cancer Types |
|---|---|
| Enlarged nucleoli | Wide range of cancers |
| Inconspicuous nucleoli | Precancerous squamous lesions of the cervix; Small-cell anaplastic lung carcinoma |
| Marked cell to cell variation in numbers or sizes | Wide range of cancers |

Therefore, based on the importance of RNA and nucleoli in the field of oncology, it is of great biological and medical value to develop RNA fluorescent probes that can clearly display nucleolar morphology in cells, especially in the pathological tissue, and then quickly distinguish cancer tissue from normal tissue by exhibiting nucleolar morphological changes.

Using H&E staining, biological structures in the pathological tissue can be shown under light microscopes, in which the nuclei are blue-black, and cytoplasm is pink. The pathologists make a diagnosis based on the following information: atypia of cells, including cell shapes, sizes, and regularity; the sizes of the nuclei, especially the nuclear to cytoplasmic ratio. However, the nucleolar morphology cannot be clearly provided by H&E staining, leading to the interpretation related to the nucleoli only depending on the experience of pathologists. Thus, in this patent, we have developed an RNA fluorescent probe which can rapidly, in situ, highly selectively stain RNA in human pathological tissue sections, especially frozen sections, and further accurately image the nucleoli. Moreover the relevant intraoperative pathological diagnostic reagents for tumors can be prepared. Very importantly, the RNA fluorescent probe provided in the invention has overcome the bottleneck that available RNA fluorescent probes can only image RNA and nucleoli in culture cells in vitro, but cannot image RNA and nucleoli in pathological tissue. Therefore, it is highly possible to resolve the general technical problem that rapid determination of the benign and malignant tumors can only rely on the century-old H&E staining method, and break out of the long-standing dilemma of solitary diagnosis.

SUMMARY

In view of the defect in the prior art, the present invention aims to provide an RNA fluorescent probe for rapidly distinguishing cancer tissue from normal tissue based on nucleolar morphological changes and its application in preparation of intraoperative pathological diagnostic reagents for tumors.

unconspicuous nucleolus in most cells of normal tissue, while the enlarged nucleoli and/or multiple nucleoli exist in many cells of cancer tissue.

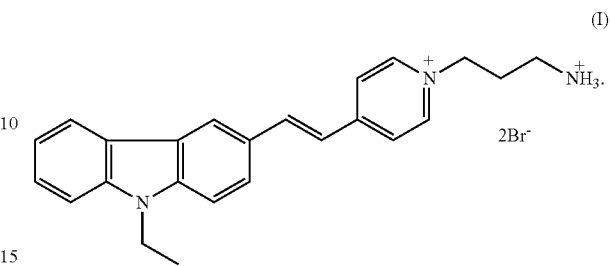

The preparation method of the RNA fluorescent probe is as follows:

compound 1 is first obtained by mixing 4-methylpyridine with 3-bromopropylamine hydrobromide. Compound 2 is synthesized by a Vilsmeier reaction. Compounds 1 and 2 are mixed to prepare a final product by a reflux reaction with piperidine as catalyst. Finally, a purified red solid product CAPY-AP is obtained by column chromatography. A reaction formula is as follows:

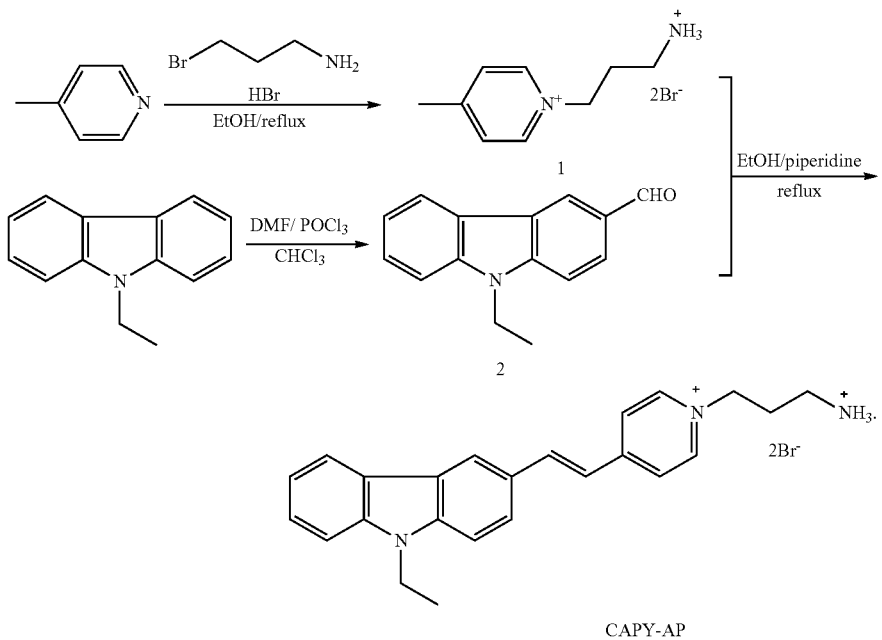

The RNA fluorescent probe described in the present invention is characterized as follows: the chemical name of the RNA fluorescent probe is (E)-1-(3-aminopropyl)-4-(2-(9-ethyl-9H-carbazol-3-yl)vinyl)pyridine-1-ium dibromide, abbreviated as CAPY-AP, and a chemical structure of the RNA fluorescent probe is shown in formula (I); the RNA fluorescent probe can target RNA in culture cells and normal tissue as well as cancer tissue and then display nucleolar morphology. The judging criteria of distinguishing the cancer tissue from the normal tissue based on the nucleolar morphological changes are that there is only single and Application of the RNA fluorescent probe for rapidly distinguishing cancer tissue from normal tissue based on nucleolar morphological changes in targeting RNA in culture cells and then displaying nucleolar morphology.

The culture cells are preferably SiHa cells.

Application of the RNA fluorescent probe for rapidly distinguishing cancer tissue from normal tissue based on nucleolar morphological changes in targeting RNA in normal tissue as well as cancer tissue and then displaying nucleolar morphology.

The normal tissue is preferably frozen pathological sections of normal mammary tissue, and the cancer tissue is preferably frozen pathological sections of mammary cancer tissue. Further, the mammary gland refers to the normal tissue or pathological tissue of the human mammary gland.

Application of the RNA fluorescent probe for rapidly distinguishing cancer tissue from normal tissue based on nucleolar morphological changes in preparation of intraoperative pathological diagnostic reagents for tumors.

Experimental results confirm that after the SiHa cells are labeled by the fluorescent CAPY-AP, under a confocal laser scanning microscope with a 488 nm laser, cytoplasmic and nucleolar areas exhibit obvious green fluorescence, which indicates that the probe can specifically image cytoplasmic RNA and nucleoli in the culture cells. The result is further confirmed with an RNA digestion experiment. In addition, the fluorescent CAPY-AP is combined with a commercial nuclear fluorescent probe Hoechst 33342, and the staining procedure provided by the present invention is used to carry out experiments in frozen sections of pathological tissue of mammary tumors. Highly clear fluorescence images are obtained, and a contrast study is conducted between the fluorescence images and H&E staining images. It can be seen that the fluorescent CAPY-AP can stain cytoplasmic as well as nucleolar RNA, and the morphology of nucleoli can be clearly visualized. It indicates that the fluorescent probe of the present invention has good permeability and can pass through the inner portions of the tissue into the nuclei and then target the nucleoli. This result is firstly reported and any other reported RNA probes cannot achieve it. In addition, by comparing the H&E images and fluorescence images of frozen sections of normal mammary tissue and mammary cancer tissue, it is found that fluorescence staining of the present invention shows obvious advantages in resolution and richness of details. Not only can some information expressed by H&E staining be provided from a new perspective, but also more detailed information can be provided, such as clearly nucleolar morphologies which cannot be provided by H&E staining. Through comparison, the applicant also has an important finding: that there is only single and unconspicuous nucleolus in most cells of normal tissue, while the enlarged nucleoli and/or multiple nucleoli exist in many cells of cancer tissue. This finding provides a criterion for rapidly distinguishing the cancer tissue from the normal tissue based on the nucleolar morphological changes. By fluorescent CAPY-AP, the mammary cancer tissue can be rapidly distinguished from the normal tissue based on the nucleolar morphological changes.

The RNA fluorescent probe provided by the present invention can target RNA in culture cells and normal tissue as well as cancer tissue and then display nucleolar morphology, and lays a foundation for its application in preparation of the intraoperative pathological diagnostic reagents for the tumors. A large quantity of experiments has demonstrated that the fluorescent CAPY-AP can image the RNA and nucleoli with high fidelity in culture cells and tissue. Especially in human mammary pathological tissue, CAPY-AP can clearly image the nucleoli, and provide the sizes, shapes, location and numbers of the nucleoli. Compared with other existing RNA probes, the carbazopyridine salt compound CAPY-AP has super-high RNA affinity and super-high permeability, and can rapidly image the RNA and nucleoli in tissue sections. In addition, the probe has characteristics of good membrane permeability, strong fluorescence and good photostability, indicating that it has a wide application as a fluorescent probe for the RNA and nucleoli, especially for imaging nucleoli in tissue. It is expected to be developed as a simple and intuitive intraoperative pathological diagnostic reagent for tumors.

BRIEF DESCRIPTION OF THE DRAWINGS

Obtaining method: the SiHa cells are incubated with CAPY-AP for 30 min, and then the cells are irradiated with a 488 nm laser under a confocal laser scanning microscope to obtain micrographs. FIG. 1a is the image of green channel at 500-600 nm from CAPY-AP excited by the 488 nm laser. FIG. 1B is a differential interference contrast (DIC) micrograph scanned by a bright field laser. FIG. 1c is the merge image of FIG. 1a and FIG. 1b.

Fluorescence images show obvious green light distribution in cytoplasmic and nucleolar areas, which clearly indicates that CAPY-AP can specifically image cytoplasmic RNA and the nucleoli in culture cells.

Figure 2:
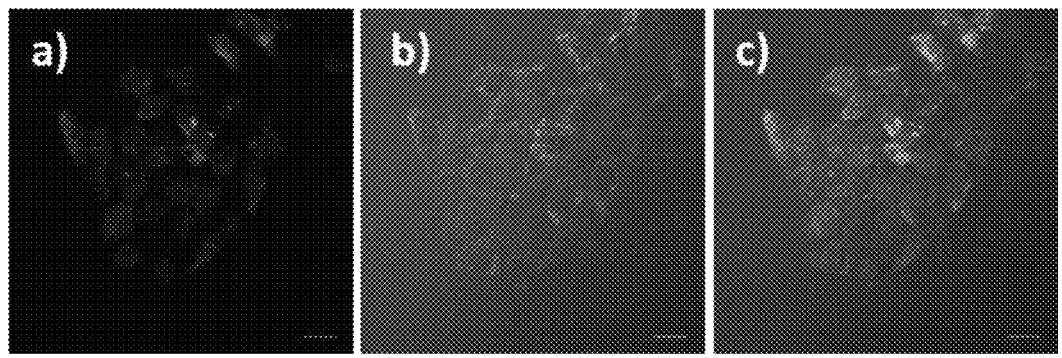

FIG. 2 shows confocal fluorescent images of fixed SiHa cells stained with CAPY-AP after RNase treatment.

Obtaining method: the fixed SiHa cells treated with RNase and then stained with CAPY-AP. Under the confocal laser scanning microscope, the cells are irradiated with the 488 nm laser to obtain micrographs. FIG. 2a is the image of a green channel at 500-600 nm from CAPY-AP excited by the 488 nm laser. FIG. 2b is a differential interference contrast (DIC) micrograph scanned by a bright field laser. FIG. 2c is the merge image of FIG. 2a and FIG. 2b.

The results show that the fluorescence of CAPY-AP in the cells treated with RNase is relatively weak, and the fluorescence in the nucleoli and cytoplasm is almost invisible.

Figure 3:
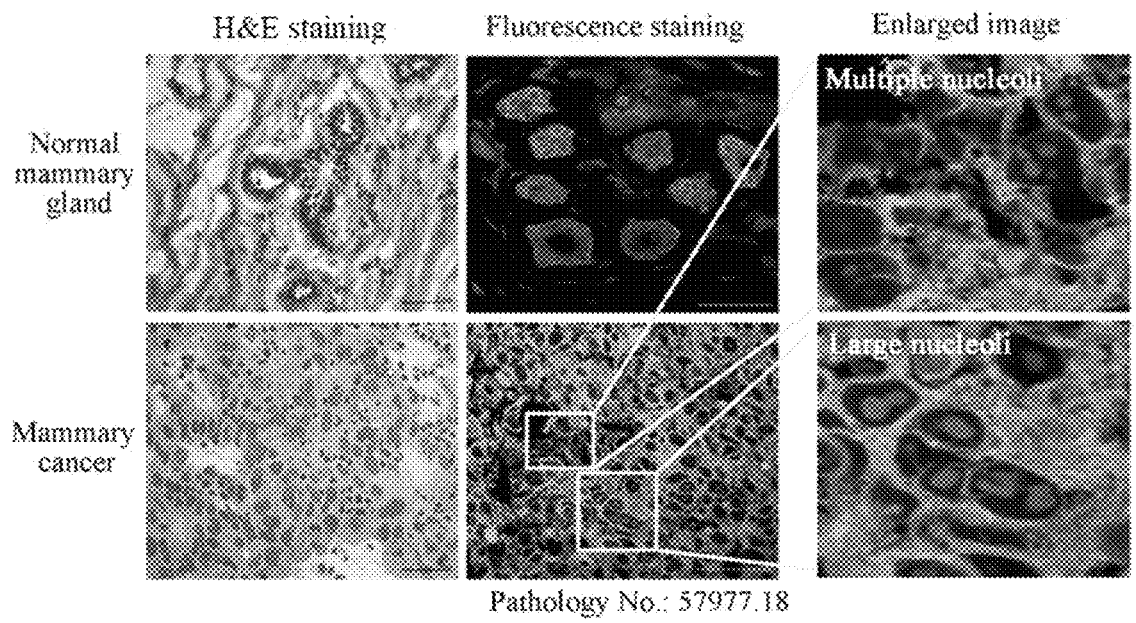

FIG. 3 shows a comparison of H&E staining and fluorescence staining of frozen sections of human mammary cancer tissue and its adjacent normal tissue (Pathology No. 57977.18).

Obtaining method: after the frozen sections of human mammary cancer tissue and its adjacent normal tissue are stained with CAPY-AP and Hoechst 33342, the tissue is irradiated with 488 nm and 405 nm lasers respectively under the confocal laser scanning microscope, and superposition images of two channels (blue channel: 420-450 nm, green channel: 500-600 nm) are obtained. The frozen sections of the same tissue are stained with H&E to obtain H&E staining images. Amongst, the enlarged images come from two box regions of fluorescent staining images of mammary cancer tissue.

Figure 4:
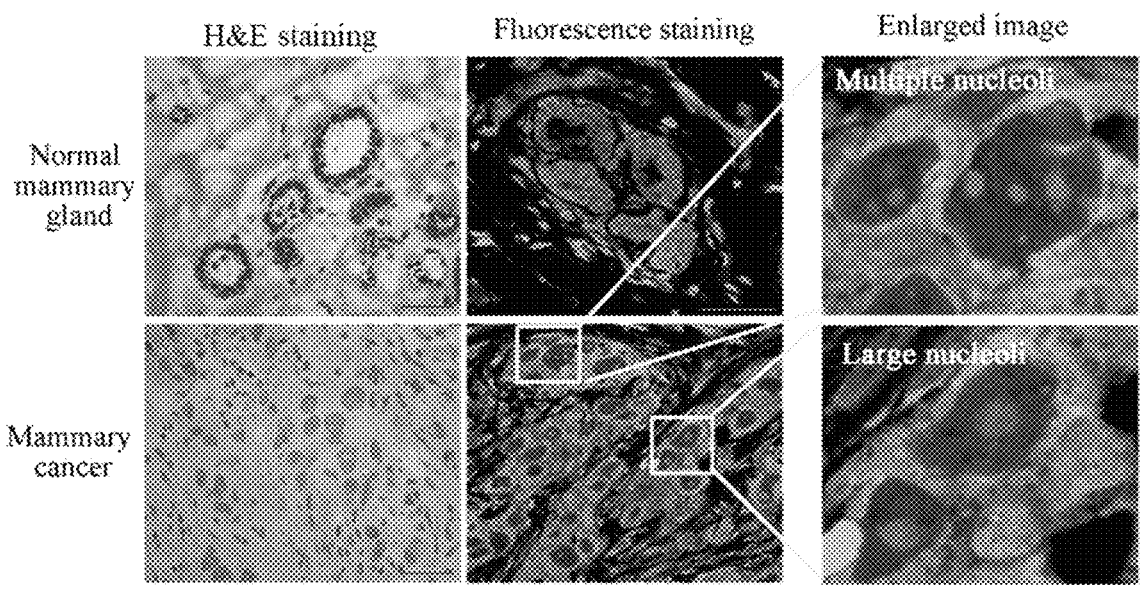

FIG. 4 shows a comparison of H&E staining and fluorescence staining of frozen sections of human mammary cancer tissue and its adjacent normal tissue (Pathology No. 60551.18).

Obtaining method: after the frozen sections of human mammary cancer tissue and its adjacent normal tissue are stained with CAPY-AP and Hoechst 33342, the tissue is irradiated with 488 nm and 405 nm lasers respectively under the confocal laser scanning microscope, and superposition images of two channels (blue channel: 420-450 nm, green channel: 500-600 nm) are obtained. The frozen sections of the same tissue are stained with H&E to obtain H&E staining images. Amongst, the enlarged images come from two box regions of fluorescent staining images of mammary cancer tissue.

Figure 5:
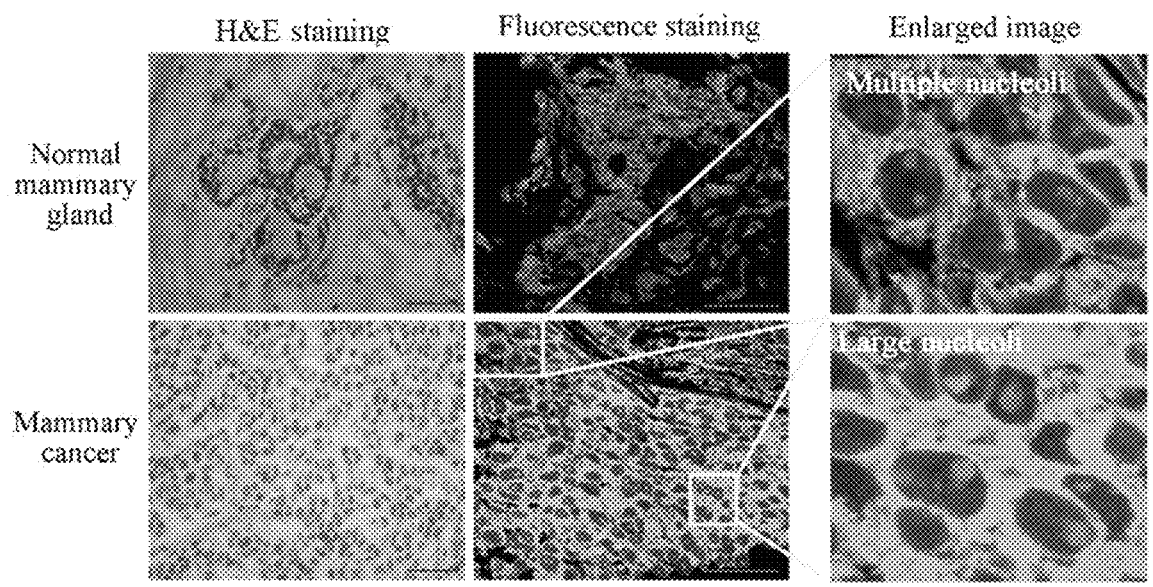

FIG. 5 shows a comparison of H&E staining and fluorescence staining of frozen sections of human mammary cancer tissue and its adjacent normal tissue (Pathology No. 61864.18).

Obtaining method: after the frozen sections of human mammary cancer tissue and its adjacent normal tissue are stained with CAPY-AP and Hoechst 33342, the tissue is irradiated with 488 nm and 405 nm lasers respectively under the confocal laser scanning microscope, and superposition images of two channels (blue channel: 420-450 nm, green channel: 500-600 nm) are obtained. The frozen sections of the same tissue are stained with H&E to obtain H&E staining images. Amongst, the enlarged images come from two box regions of fluorescent staining images of mammary cancer tissue.

According to the results in FIG. 3, FIG. 4 and FIG. 5, it is found that CAPY-AP can specifically image the cytoplasmic RNA and nucleoli in frozen sections of human mammary pathological tissue. In addition, the probe can clearly image the sizes, shapes, location and numbers of nucleoli in two enlarged images. At the same time, it was also found that there were enlarged nucleoli and/or multiple nucleoli in mammary cancer tissue, while the nucleoli in the normal tissue are smaller and less conspicuous. However, the nucleoli in the cancer tissue and the normal tissue cannot be displayed clearly in the H&E staining images.

DETAILED DESCRIPTION

The following describes the present invention in detail with reference to the specific accompanying drawings and embodiments. Described in the following embodiments are only exemplary implementations of the present invention. It should be clear that the following instructions are just in order to explain the present invention, not make any restrictions in the form of the present invention. Any simple modification, equivalent change or modification to the implementation according to the technical essence of the present invention shall fall within the scope of the technical solution of the present invention.

In the following embodiments, tissue frozen sections involved are provided by the cooperating organization, the department of pathology, Qilu Hospital of Shandong University, and materials, cells, reagents, etc. used are obtained commercially unless otherwise specified.

Example 1: Synthesis of CAPY-AP

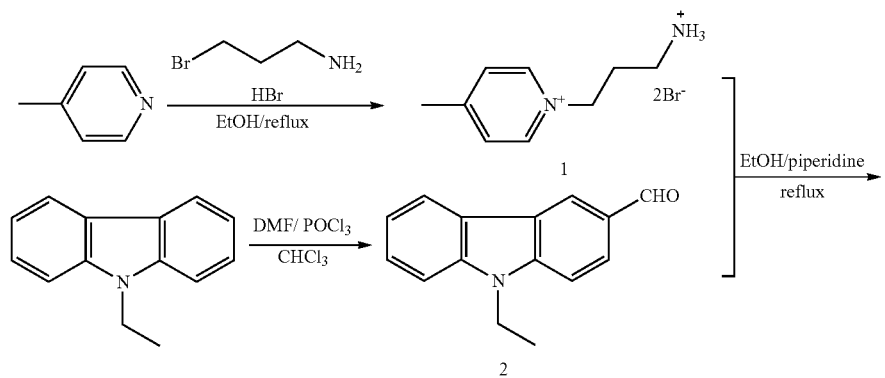

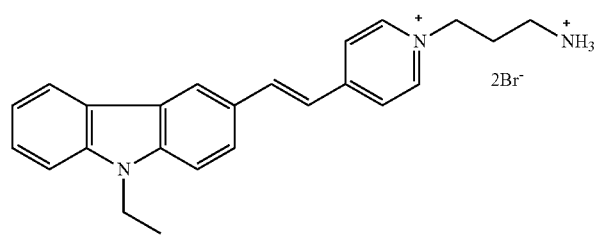

CAPY-AP

The specific synthesis is as follows:

synthesis of compound 1: 4-methylpyridine (0.93 g, 10 mmol) and 3-bromopropylamine hydrobromide (2.41 g, 11 mmol) were dissolved in 20 mL ethanol and heated at 85° C. for a reflux reaction for 12 hours. At the end of the reaction, white solid appeared. After filtration and washing with petroleum ether, pure white compound 1 was obtained. The yield was 70%. $^1$H NMR (300 MHz, DMSO-d$_6$), δ (ppm): 8.938; (d, J=6 Hz, 2H), 8.047; (d, J=6.3 Hz, 2H), 7.797; (s, 3H), 4.628-4.582; (t, J=6.9 Hz, 2H), 2.860-2.794; (m, 2H), 2.622; (s, 3H), 2.220-2.124; (m, 2H).

Synthesis of compound 2: POCl$_3$ (9.2 mL, 100 mmol) was slowly added into dry DMF (7.7 mL, 100 mmol) under an ice bath condition. After stirring for 30 min, viscosity appeared. Then N-ethylcarbazole (2.94 g, 10 mmol) dissolved in CHCl$_3$ was added into the system. After stirring for 1 hour continuously, the mixture was heated at 80° C. for a reaction for 12 hours. After cooling to room temperature, the mixture was poured into ice water and the pH of the system was adjusted to be neutral with NaOH. Then extraction with CH$_2$Cl$_2$ was conducted, and an organic phase was washed with water twice and dried with anhydrous magnesium sulfate for 3 hours. Finally, ethyl acetate/petroleum ether (1:8, V/V) was used as an eluent, and separation purifying by column chromatography was conducted to obtain a light-yellow pure substance. The yield was 50%. $^1$H NMR (300 MHz, DMSO-d6), δ (ppm): 10.07 (s, 1H), 8.79; (s, 1H), 8.31; (d, J=7.8 Hz, 1H), 8.02-7.989; (m, 1H), 7.80; (d, J=6.6 Hz, 1H), 7.72; (d, J=8.1 Hz, 1H), 7.55; (t, J=7.65 Hz, 1H), 7.31; (d, J=7.5 Hz, 1H), 4.53; (t, J=7 Hz, 2H), 1.34; (t, J=7.05 Hz, 3H).

Synthesis of compound CAPY-AP: compound 1 (0.52 g, 1.67 mmol) and compound 2 (0.45 g, 2 mmol) were dissolved in 15 mL ethanol to obtain a yellow transparent solution, and 3-4 drops of piperidine were added to make the solution turn red quickly. Reaction was heated to reflux overnight, and then red solid precipitates were obtained. After cooling, filtration, and washing with ethanol, dichloromethane/methanol (20:1) was used as an eluent to obtain a purified red solid product by column chromatography, namely CAPY-AP with a yield of 40%. $^1$H NMR (300 MHz, DMSO-d$_6$): δ8.94 (d, J=6.9 Hz, 2H), 8.61; (s, 1H), 8.30-8.19; (m, 4H), 7.93-7.90; (m, 4H), 7.86; (d, J=11.1 Hz, 1H), 7.77; (d, J=8.7 Hz, 1H), 7.75-7.29; (m, 2H), 7.29; (t, J=7.5 Hz, 1H), 4.59; (t, J=6.9 Hz, 2H), 4.52; (m, 2H), 2.88; (m, 2H), 2.22; (m, 2H) 1.34; (t, J=7.1 Hz, 3H). $^{13}$C NMR (75 MHz, DMSO-d$_6$), δ (ppm): 154.26, 144.43, 143.36, 141.5, 140.64, 129.21, 126.94, 126.86, 126.71, 123.71, 123.24, 122.62, 121.75, 120.97, 120.43, 120.43, 120.16, 114.36, 110.34, 110.19, 56.87, 37.74, 36.14, 28.96, 14.21. HRMS: m/z (C$_{24}$H$_{27}$Br$_2$N$_3$), found: 356.2184 [M-2Br—H]$^{2+}$.

Example 2: SiHa Cells Culture

SiHa cells were cultured in adherent conditions in a culture media containing 10% fetal bovine serum and incubated in a 37° C. and 5% CO$_2$ saturated humidity incubator. The culture media was replaced every 2-3 days for passage once. When the cells grew to a logarithmic stage, cover glass-graft culture was conducted: (1) a cover glass was soaked in anhydrous ethanol for 30 min, and then was dried with an alcohol lamp and put into a disposable 35 mm culture dish for standby application; and (2) the overgrown cells in a 100 mL cell flask were washed with PBS three times and digested with 1 mL of 0.25% trypsin for 3-5 min, the trypsin was carefully poured out, fresh culture media was added, blowing was conducted evenly, the cells were counted, the cell density was controlled with the adding amount of the culture media to make the final concentration of the cells be 1×10$^5$ per ml, then the cells were seeded into the culture dish containing the cover glass and cultured in a 5% CO$_2$ incubator for growing on the cover glass. After the SiHa cells grew on the cover glass and grew over the cover glass, they were used in the experiment.

Example 3: Staining Live SiHa Cells with CAPY-AP

First, DMSO solution of a 5 mM CAPY-AP was prepared as a stock solution. After SiHa cells grew over a cover glass, culture medium in culture dish was removed, the cover glass with the SiHa cells was rinsed with clean PBS 3 times, and the cells were stained with 5 μM CAPY-AP, and incubated in a CO$_2$ incubator for 30 min. After staining, the cover glass with cells was taken out, excess probes were washed off, the cover glass with the cell growth side facing down covers a glass slide, and the staining locations, fluorescence distribution and brightness changes of the cells were observed under a confocal laser scanning microscope (the cells were irradiated with a 488 nm laser).

Figure 1:
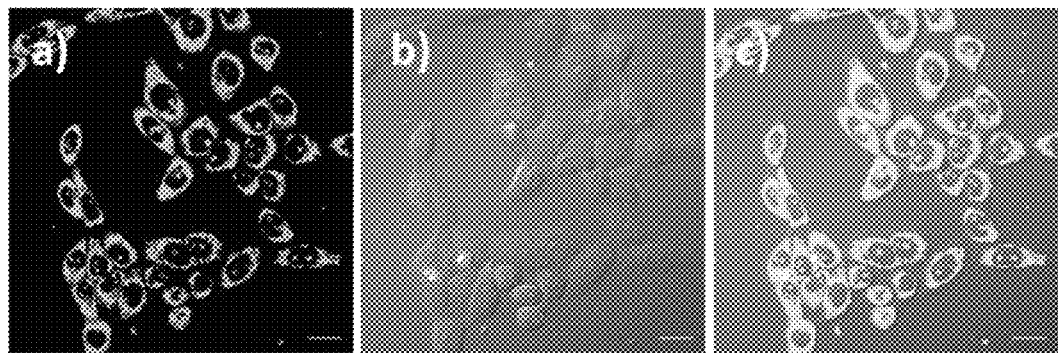
FIG. 1 shows confocal fluorescent images of live SiHa cells stained with CAPY-AP.

Results are shown in FIG. 1. FIG. 1a is the image of the green channel at 500-600 nm from CAPY-AP excited by the 488 nm laser. FIG. 1B is a differential interference contrast (DIC) micrograph scanned by a bright field laser. FIG. 1c is the merge image of FIG. 1a and FIG. 1B. Fluorescence images show obvious green light distribution in cytoplasmic and nucleolar areas, which clearly indicates that CAPY-AP can specifically image cytoplasmic RNA and nucleoli in culture cells.

Example 4: Staining Observation of RNase-Treated SiHa Cells (RNase Digestion Assay) with CAPY-AP Preparation of fixed cells: first, the cover glass covered with the SiHa cells prepared in Example 2 was immersed in a 4% paraformaldehyde solution for 30 min, and then 0.5% Triton X-100 was used for permeation at room temperature for 2 min to obtain the fixed cells.

A group of the above fixed cells was taken out and digested in an incubator for 2 hours after RNase with a 25 μg/mL concentration was added, then washed with PBS 3 times and stained with a 5 μM CAPY-AP in a CO$_2$ incubator for 30 min. The cover glass with stained cells was taken out, excess dyes were washed off, the cover glass with a cell growth side facing down covers a glass slide, and the staining locations, fluorescence distribution and brightness changes of the cells were observed under a confocal laser scanning microscope (the cells were irradiated with a 488 nm laser) and recorded.

Results are shown in FIG. 2. FIG. 2a is the fluorescent image of a green channel at 500-600 nm from CAPY-AP excited by the 488 nm laser. FIG. 2b is a differential interference contrast (DIC) micrograph scanned by a bright field laser. FIG. 2c is the merge image of FIG. 2a and FIG. 2b. It is found that the fluorescence of the cells treated with the RNase is weak, and the fluorescence in the nucleoli and cytoplasm is almost invisible. Since the RNase can hydrolyze RNA in the cells, it can be certified and verified that the probe of the present invention can selectively target the RNA in the cells.

Example 5: Fluorescence staining was conducted on frozen sections of human mammary cancer tissue and its adjacent normal tissue (Pathology No. 57977.18), and fluorescence images were compared with corresponding H&E staining images, and respective diagnostic criteria were given at the same time.

The frozen sections of the mammary cancer tissue and its adjacent normal tissue from intraoperative pathological samples of breast cancer patients (Pathology No. 57977.18) were obtained from the department of pathology, Qilu Hospital of Shandong University. In order to stain, the frozen sections were immersed into a 10% EtOH PBS buffer solution with a 10 µM CAPY-AP and a 10 µM Hoechst 33342 for 10 min, and then observed under a confocal laser scanning microscope (the tissue was irradiated with 488 nm and 405 nm lasers respectively) to obtain fluorescence images. The fluorescence images were compared with the corresponding H&E images.

Results are shown in FIG. 3 and Table 2.

In FIG. 3, the fluorescence images show obvious green light distribution in cytoplasmic and nucleolar areas, while no fluorescence exists in extracellular matrices. It clearly indicates that the probe of the present invention can specifically image cytoplasmic RNA and nucleoli in human mammary cancer tissue and normal mammary tissue. In addition, the sizes, shapes, location and numbers of the nucleoli can be clearly shown in magnified fluorescence images. By comparing the H&E images and the fluorescence images of the frozen sections of the normal mammary tissue and mammary cancer tissue, it is obvious that fluorescence staining has great advantages. The morphologies of the nucleoli in the tissue can be clearly shown, whereas the nucleoli were not clearly seen in the H&E images. In addition, we also have found a phenomenon that only single inconspicuous nucleoli exist in the normal mammary tissue, while enlarged nucleoli and/or multiple nucleoli exist in the mammary cancer tissue.

fluorescence images were compared with corresponding H&E staining images.

The frozen sections of the mammary cancer tissue and its adjacent normal tissue from intraoperative pathological samples of breast cancer patients (Pathology No. 60551.18) were obtained from the department of pathology, Qilu Hospital of Shandong University. In order to stain, the frozen sections were immersed into a 10% EtOH PBS buffer solution with a 10 µM CAPY-AP and a 10 µM Hoechst 33342 for 10 min, and then observed under a confocal laser scanning microscope (the tissue was irradiated with 488 nm and 405 nm lasers respectively) to obtain fluorescence images. The fluorescence images were compared with the corresponding H&E images.

Results are shown in FIG. 4. The fluorescence images display that CAPY-AP can specifically image the cytoplasmic RNA and nucleoli in the frozen sections of the human mammary pathological tissue. In addition, enlarged images show the phenomenon that the enlarged nucleoli and/or multiple nucleoli exist in the mammary cancer tissue. The nucleoli in the normal tissue are smaller and less conspicuous than those in the cancer tissue. It is proved that the probe has a significant advantage in imaging the nucleoli of the pathological tissue compared with the H&E staining. The pathological diagnostic criteria for mammary tumor with fluorescent staining given in Example 5 have been proven again.

Example 7: Fluorescence staining was conducted on frozen sections of human mammary cancer tissue and its adjacent normal tissue (Pathology No. 61864.18), and the fluorescence images are compared with corresponding H&E staining images.

TABLE 2

Pathological Diagnostic Criteria for Mammary Tumor via H&E Staining and Fluorescence Staining of Frozen Sections

| Methods | Diagnostic Criteria | Normal Mammary Gland | Mammary Cancer | |
|---|---|---|---|---|
| H&E | Tissue structures and cell morphologies Sizes and morphologies of cells and nuclei | Normal morphologies Relatively uniform, nuclear chromatin is uniform, and nuclear membranes are thin, smooth and regular. | Abnormal morphologies The sizes and morphologies are different, the nuclei are enlarged, chromatin is not uniform and in a thick block shape, and nuclear membranes are thickened irregular | The interpretation of images is based on pathologist's experience, and only highly qualified pathologists can issue frozen section reports |
| | Nuclear to cytoplasmic ratio | Normal | Increased | |
| Fluorescence | Providing some information displayed by H&E staining, with emphasis on nucleolar changes for judgment | Most cells contain single inconspicuous nucleoli | Many Cells contain enlarged nucleoli and multiple nucleoli | Judgment is visually intuitive and accurate |

According to the respective diagnostic criteria of H&E and fluorescence in Table 2, it is visually intuitive to distinguish mammary cancer tissue from the normal tissue by nucleolar morphological changes in the fluorescent images.

Example 6: Fluorescence staining was conducted on frozen sections of human mammary cancer tissue and its adjacent normal tissue (Pathology No. 60551.18), and the The frozen sections of the mammary cancer tissue and its adjacent normal tissue from intraoperative pathological samples of breast cancer patients (Pathology No. 61864.18) were obtained from the department of pathology, Qilu Hospital of Shandong University. In order to stain, the frozen sections were immersed into a 10% EtOH PBS buffer solution with a 10 µM CAPY-AP and a 10 µM Hoechst 33342 for 10 min, and then observed under a confocal laser scanning microscope (the tissue was irradiated with 488 nm and 405 nm lasers respectively) to obtain fluorescence images. The fluorescence images were compared with the corresponding H&E images.

Results are shown in FIG. 5. The fluorescence images display that CAPY-AP can specifically image the cytoplasmic RNA and nucleoli in the frozen sections of the human mammary pathological tissue. In addition, enlarged images show the phenomenon that the enlarged nucleoli and/or multiple nucleoli exist in the mammary cancer tissue. The nucleoli in the normal tissue are smaller and less conspicuous than those in the cancer tissue. It is proved that the probe has a significant advantage in imaging the nucleoli of the pathological tissue compared with the H&E staining. In addition, the nucleoli can hardly be seen in the H&E staining images, again proving that CAPY-AP has a significant advantage in imaging the nucleoli of the pathological tissue compared with the H&E staining. At the same time, the pathological diagnostic criteria for mammary tumor with fluorescent staining given in Example 5 have also been proven again.

What is claimed is:

1. An RNA fluorescent probe for rapidly distinguishing cancer tissue from normal tissue, wherein a chemical name of the RNA fluorescent probe is (E)-1-(3-aminopropyl)-4-(2-(3-(9-ethyl-carbazol))vinyl)pyridine dibromide salt, abbreviated as CAPY-AP; a chemical structure of the RNA fluorescent probe is shown in formula (I):

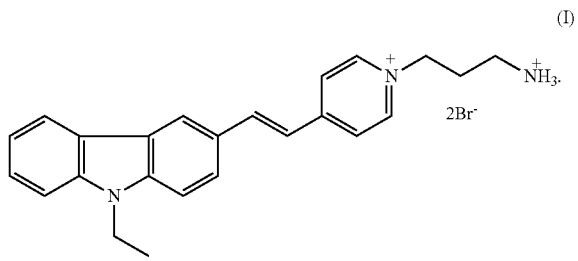

(I)

2. A method for tissue processing and analysis using the RNA fluorescent probe according to claim 1, comprising:
   (1) applying the RNA fluorescent probe to a tissue section, wherein the probe binds to RNA in the tissue to form fluorescent labeling;
   (2) using fluorescence microscopy to observe the treated tissue section and obtain fluorescence images showing nucleolar size and nucleolar number of cells; and
   (3) determining tissue characteristics based on the nucleolar size and nucleolar number observed in the obtained fluorescence images, wherein cancer tissue is identified by comparing cells in cancer tissue with cells in normal tissue, with cancer cells exhibiting multiple nucleoli and/or increased nucleolar size.

3. A method for preparing the RNA fluorescent probe for rapidly distinguishing cancer tissue from normal tissue according to claim 1, comprising the steps of firstly mixing 4-methylpyridine with 3-bromopropylamine hydrobromide to react to obtain compound 1; performing a Vilsmeier reaction to synthesize compound 2; mixing compound 1 and compound 2 to prepare a final product by a reflux reaction with piperidine as a catalyst; and finally obtaining a purified red solid product CAPY-AP by column chromatography, wherein the structures of compound 1 and compound 2 are as follows:

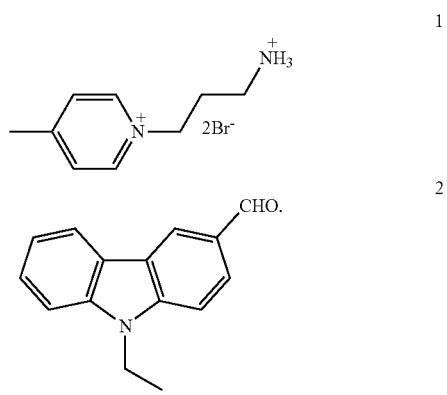

4. A method for rapid staining cultured cells, wherein the method comprises staining cells with the RNA fluorescent probe of claim 1, labeling or displaying distributions of RNA and nucleoli in the cells.

5. The method according to claim 4, wherein the cells are cancer cells or normal cells.

6. A method for rapidly distinguishing cancer tissue from normal tissue, wherein the method comprises staining all cells in a tissue section with the RNA fluorescent probe of claim 1, labeling or displaying distributions of RNA and nucleoli in all cells.

7. The method of claim 6, wherein the tissue section is a normal tissue section or a pathological section.

8. The method of claim 6, wherein the tissue section is a tissue section of mammary gland.

9. The method of claim 6, wherein judging criteria of distinguishing the cancer tissue from the normal tissue are that there is only single and unconspicuous nucleolus in most cells of normal tissue, while the enlarged nucleoli and/or multiple nucleoli exist in many cells of cancer tissue.

10. A rapid pathological diagnostic reagent for rapidly distinguishing cancer tissue from normal tissue, comprising the RNA fluorescent probe according to claim 1.

* * * * *